Jan. 12, 1960 D. H. PRITCHARD ET AL 2,921,120

BURST AMPLITUDE CONTROL OF INTERMEDIATE FREQUENCY AMPLIFIER FREQUENCY RESPONSE

Filed March 31, 1955 2 Sheets-Sheet 1

INVENTORS
DALTON H. PRITCHARD
& ALFRED C. SCHROEDER
BY [signature]
ATTORNEY

Jan. 12, 1960 D. H. PRITCHARD ET AL 2,921,120

BURST AMPLITUDE CONTROL OF INTERMEDIATE FREQUENCY AMPLIFIER FREQUENCY RESPONSE

Filed March 31, 1955 2 Sheets-Sheet 2

INVENTORS
DALTON H. PRITCHARD
& ALFRED C. SCHROEDER

BY [signature]

ATTORNEY 2,921,120
Patented Jan. 12, 1960

2,921,120

BURST AMPLITUDE CONTROL OF INTERMEDIATE FREQUENCY AMPLIFIER FREQUENCY RESPONSE

Dalton H. Pritchard, Princeton, N.J., and Alfred C. Schroeder, Huntingdon Valley, Pa., assignors to Radio Corporation of America, a corporation of Delaware Application March 31, 1955, Serial No. 498,191

10 Claims. (Cl. 178—5.4)

The present invention relates to new and improved apparatus for controlling the response of wide band amplifiers and, more particularly, to chroma control apparatus for use in conjunction with color television receivers.

In accordance with the color television standards promulgated by the Federal Communications Commission on December 17, 1953, the transmitted composite color television signal includes, in addition to scanning synchronizing information in the form of pulses, a luminance signal which is indicative of the brightness of elemental areas of the image being televised and a chrominance signal in the form of a phase- and amplitude-modulated subcarrier wave which is representative of the hue and saturation of the image. The subcarrier wave has a nominal or mean frequency of approximately 3.58 megacycles per second, which frequency is in the high frequency region of the video signal spectrum. Since, in the reconstruction of the television image of the receiver, the saturation of the image is dependent upon the amplitude of the crominance signal or subcarrier information, it is important that the gain of the receiver be controlled in such manner as to insure proper amplitude of the chrominance signal with respect to the luminance signal. Such control has been termed and will be referred to herein as "chroma control."

It is an object of the present invention to provide novel means for controlling the frequency response of a wide band amplifier in such manner as to control the response of the amplifier to afford differential amplification of different frequencies within a band of signal frequencies being amplified thereby.

Another and more specific object of the invention is to provide new and improved chroma control apparatus for maintaining the response of a color television receiver adjusted to provide a predetermined ratio of the amplitude of a chrominance signal with respect to the amplitude of a lower frequency luminance signal.

In general, the present invention, in accordance with one aspect thereof, exploits the well-known Miller effect of an amplifier tube whereby the input capacity of the tube varies generally in proportion to the gain of the tube. Specifically, such a tube is in an amplifying channel and so connected that its input capacity is electrically located as to be effective in controlling the frequency response of a channel. Means are provided for varying the gain of the tube, whereby to vary its input capacity in order to vary the frequency response of the channel and snap-action means are included additionally for causing the frequency response of the channel to revert to a fixed condition for the reception of a black-and-white television signal.

As will be appreciated, the novel control means of the present invention is capable of affording the desired response of an amplifier while not varying its gain and of switching the amplifier response automatically between the proper conditions for color and monochrome image reproduction.

Additional objects and advantages of the present invention will become apparent to those skilled in the art from a study of the following detailed description of the accompanying drawing, in which.

Figures 1, 2, 4A, 4B, 4C:
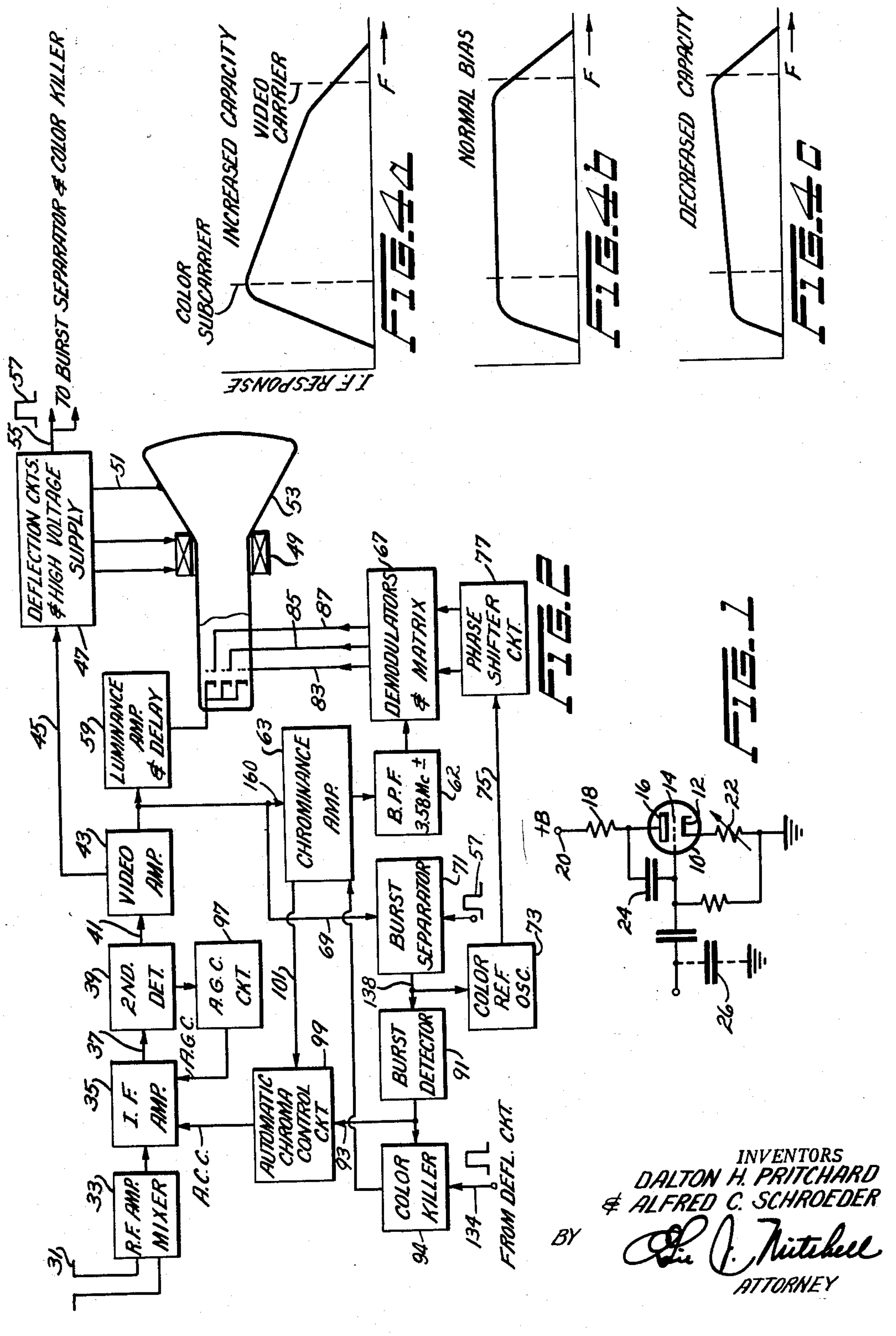
Figure 1 is a schematic diagram of an electron discharge tube circuit useful in describing the Miller effect.
Figure 2 illustrates, by way of a block diagram, a typical color television receiver with which the present invention may be advantageously employed as a chroma control arrangement.

In Figure 1, there is shown an electron discharge tube amplifier 10 having a cathode 12, control electrode 14 and anode 16. The anode of the tube is connected through a load resistance 18 to a source of positive operating potential at the terminal 20, while the cathode 12 is connected to a point of fixed reference potential (viz. ground) through a variable, unbypassed resistor 22. The plate or anode to grid capacitance of the tube 10 is illustrated by the capacitor 24. The apparent input capacitance of the amplifier tube 10 may be expressed as follows:

$$C_{\text{input}} = C_{GK} + (1+A)C_{GP}$$

where $C_{GK}$ is the control electrode-to-cathode capacitance, $C_{GP}$ is the control electrode-to-anode capacitance and A is the gain of the stage.

As explained in detail, for example, in chapter 7 of the "Radiotron Designers Handbook," third edition, as published for the Wireless Press, the grid input impedance of a triode type of electron discharge tube with a load in its plate circuit is a function of the impedance of the plate load and of the operating characteristics of the tube, which effect is known as the Miller effect. According to the Miller effect, if the plate load of such an electron discharge tube is a resistance, the input impedance of the tube is capacitive, which capacitive impedance may be varied by changing the bias on the control electrode of the tube. It will be understood, therefore, that the input capacity 26 shown in dotted lines in Figure 1 may be varied by varying the parameter A in the above equation. The gain of the electron tube amplifier 10 in Figure 1 may be varied, for example, through the agency of the variable cathode resistor 22 which, by virtue of the fact that it is not by-passed for alternating current, introduces a variable amount of cathode degeneration. In accordance with an aspect of the present invention, the Miller effect as explained in accordance with the illustrative showing of Figure 1, is exploited in controlling the amplitude-versus-frequency response of a wide band amplifier channel (e.g. an intermediate frequency amplifier), as will be explained more fully hereinafter.

There is shown in Figure 2 a block diagram of a color television receiver with which the present invention may be employed. An incoming carrier wave, amplitude modulated by the composite color television signal, is intercepted by an antenna 31 and is applied to a tuner section 33 which includes radio frequency amplification stages and a mixer or first detector wherein the modulated carrier wave is translated in frequency to an intermediate frequency range. The intermediate frequency (IF) signals are, in turn, applied to an IF amplifier 35 which may, for example, comprise a plurality of stagger-tuned stages. The amplified IF signals are applied via a lead 37 to a second or video detector 39 which provides at its output terminal 41 the detected composite color television signal including scanning synchronizing pulses, bursts of subcarrier energy (i.e. color synchronizing bursts) on the "back porch" of the horizontal blanking pedestals and the broad band of video signals including luminance and chrominance components.

The composite signal thus recovered from the video detector 39 is amplified in a broad band video amplifier stage 43 and is applied simultaneously to several channels of the receiver, as follows: the signal is applied via a lead 45 to the deflection and high voltage circuits 47 comprising suitable means for generating scanning saw-tooth current waves of television line and field frequencies for application to the electromagnetic deflection yoke 49. In a well known manner, the flyback voltage pulses produced in the horizontal deflection circuit are rectified to produce a high, unidirectional positive potential for application via a lead 51 to the final anode of the tri-color kinescope 53. Also produced by the deflection circuits 47 and provided at the terminal 55 are burst gating pulses 57 corresponding to the horizontal flyback pulses and having a duration corresponding substantially to that of the color synchronizing burst referred to above. The gating pulses 57 may be produced, for example, through the agency of a flyback winding on the horizontal deflection output and high voltage transformer forming a part of the horizontal deflection circuit.

The luminance signal component of the composite received television signal is applied from the video amplifier 43 to a luminance amplifier and delay circuit represented by the block 59 which provides at its output terminal 61 the luminance signal $E_Y$ for application to the cathodes of the color image reproducing kinescope 53.

The composite color television signal is also applied to a chrominance amplifier 63 which has associated therewith a bandpass filter 62 which serves to separate the subcarrier wave or chrominance signal information from the composite signal. The amplified chrominance signal is, in turn, applied via a lead 65 to the demodulator and matrix circuit 67. The demodulators and matrix 67 may be understood as performing a process of synchronous demodulation upon the chrominance signal to derive therefrom the "color-difference" signals employed in modulating the phase and amplitude of the subcarrier wave at the transmitter. A detailed discussion of the operation of such circuitry may be found in an article entitled "Color Television Signal Receiver Demodulators" by D. H. Pritchard and R. N. Rhodes, June 1953 issue of the RCA Review. The demodulating action requires the provision of subcarrier frequency waves of fixed phase with respect to a reference, which waves may be derived from a color reference oscillator 73 producing a continuous 3.58 mcs. wave and synchronized as to phase and frequency by the color synchronizing bursts accompanying the composite signal. Specifically, the composite signal is applied from the output of the video amplifier 43 via a lead 69 to a burst separator circuit 71 which receives from the terminal 55 of the deflection circuits the burst gating pulses 57 which are applied to the burst separator circuit. The separated color synchronizing bursts are employed in synchronizing the operation of the color reference oscillator 73 as through the use of a frequency controlling circuit or AFC arrangement. Thus, the output wave from the oscillator 73 may be applied via a lead 75 to a phase shifting circuit 77 which provides, at its output leads 79 and 81, subcarrier waves of fixed phase with respect to the phase of the reference burst for application to the demodulators and matrix contained within the block 67. Through the process of synchronous demodulation, the circuit 67 produces the color-difference signals R—Y, G—Y and B—Y, where R, G and B represent the component color signals and Y represents the luminance signal. The color-difference signals from the demodulators in the circuit 67 are applied to the beam intensity controlling electrodes of the color kinescope 53 via the leads 83, 85 and 87, respectively, so that the kinescope serves to combine the color-difference signals with the luminance signal in such manner that the intensities of the respective beams of the kinescope are controlled in accordance with the component colors of the image being reproduced.

The separated bursts from the separator or gating circuit 71 are applied to a burst detector or rectifier circuit 91 which provides at its output lead 93 a direct current voltage whose amplitude is a function of the burst amplitude. The voltage at lead 93 controls a "color killer" circuit 94 whose function is that of disabling the chrominance channel during the reception of black-and-white broadcast signals (from which color synchronizing bursts are absent) or when the amplitude of the burst is so low as to preclude the rendition of a color image.

As thus far described, the apparatus illustrated in Figure 2 is of generally conventional form and need not be described further. As has been pointed out supra, control of the relative amplitudes of the chrominance and luminance components of the composite color television signal is required for the proper reproduction of the color television image. If, for example, there should occur a change in the relative levels of the color subcarrier wave and the main picture carrier wave at any point in the transmission link between the television transmitter and the receiver, as by reason of radio frequency transmitter response, propagation effects, receiving antenna response, RF tuning and the like, the degree of image saturation will be faulty unless corrected. Such correction may be accomplished, in accordance with the present invention, by varying the frequency response of the receiver at some point therein preceding the separation of the chrominance and luminance components of the composite signal.

The color burst rectifier 91 also provides at its output lead 93 an automatic chroma control (A.C.C.) voltage or signal for application to the intermediate frequency amplifier 35. That is to say, the color synchronizing bursts inserted in the composite signal at the transmitter are of fixed amplitude relative to the main carrier wave, so that the amplitude of the bursts at the receiver will be understood as providing an indication of the response of the overall transmission link to the subcarrier frequency. Hence detection of the amplitude of the color synchronizing bursts as by rectification in the circuit 91 provides a direct current voltage varying in accordance with the amplitude of the 3.58 mc. per second color burst signal.

The various proposals for obtaining automatic chroma control in a color television receiver may be categorized generally into, first, those arrangements which control the gain of a chrominance signal channel and, second, those which control the amplitude versus frequency response characteristic of a receiver at some point therein preceding the circuitry which decodes or detects from the chrominance signal the color difference signals employed in image reconstruction. The present invention will be understood as being within the latter class of automatic chroma control arrangements, in that it provides means for "tipping" the amplitude versus frequency response characteristic of the receiver in order to maintain the proper relative amplitudes of chrominance signal components to luminance signal components. As shown in Fig. 2, the color television receiver is provided with an automatic gain control (AGC) arrangement for maintaining the overall gain of the receiver substantially constant. The AGC circuit 97 may be of any suitable type capable of detecting the amplitude of the received composite signal and providing a control or bias voltage for application to the radio frequency band or intermediate frequency signal amplifiers to control their gain in such manner as to effect substantially constant signal amplitude despite varying transmission conditions.

The automatic chroma control circuit 99 in Fig. 2 is represented diagrammatically as a block which is controlled by the output signal of the burst amplitude detector 91 and which, in turn, provides an automatic chroma control voltage signal for application to the intermediate frequency amplifier 35. Advantageous features of the present invention are that it maintains the overall response of the receiver (i.e. its response to both luminance and chrominance signal components) substantially "flat" by controlling the frequency response of the IF amplifier during reception of color television signals including the color synchronizing burst. Also, means are provided in accordance with the present invention for precluding erroneous control of the frequency response of the IF amplifier during the reception of black and white signals, from which the color synchronizing bursts are absent. That is to say, the invention provides a "snap action" for returning the response characteristic of the receiver to its proper shape when no automatic chroma control is required during black and white reception. The apparatus for affording such automatic snap action is indicated diagramatically in Fig. 2 by the lead 101 connecting the chrominance amplifier 63 to the automatic chroma control circuit 99 and will be described in detail hereinafter.

Figure 3:
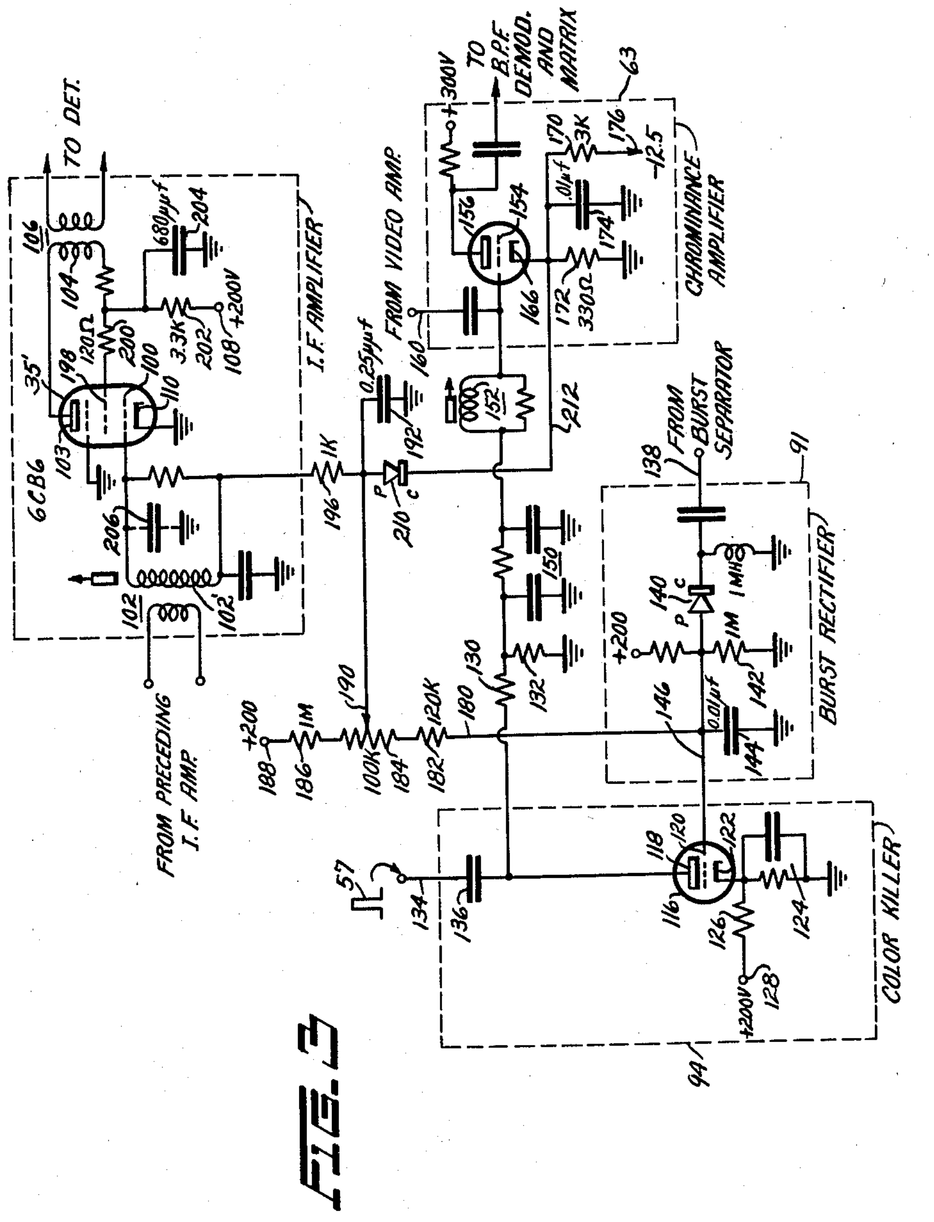
Figure 3 is a block and schematic diagram of an arrangement in accordance with one form of the invention; and Figures *4a*, *4b* and *4c* are response curves to be described in connection with the apparatus of Figure 3.

A specific circuit arrangement suitable for performing the functions indicated in Fig. 2 is shown schematically in Fig. 3 wherein the electron tube 35' may be considered as constituting the final one of a plurality of stagger-tuned amplifier stages forming the IF portion of the receiver. The control electrode 100 of the tube 35' receives IF signals via the transformer 102 from the preceding amplifier stage (not shown). The anode 103 of the amplifier 35' is connected through the primary winding 104 of a coupling transformer 106 to a positive operating potential at the terminal 108. The cathode 110 of the amplifier 35' is connected to a point of fixed reference potential (viz. ground).

In connection with the biasing of the amplifier 35', it is to be noted that any wide-band amplifier stage which is utilized for automatic chroma control should be adjusted for maximum loop gain for the direct current control signal. This is accomplished in the apparatus of Fig. 3 by eliminating the usual cathode resistor-capacitor bias network and grounding the cathode. Proper operating bias for the control electrode is obtained by setting the "flat" response control voltage at a sufficiently negative value. In this manner, high frequency response of the amplifier is not altered, even though the D.-C. degeneration which such as R-C network would have caused is eliminated.

Normally, the IF amplifier stages of a color television receiver of the type in question are tuned to have an overall response such as that shown by the curve of Fig. 4*b*. Assuming, however, that the response of the transmission link changes in the region of the subcarrier wave frequency such that the amplitude of the chrominance signal changes with respect to that of the luminance component, returning of the intermediate frequency amplifier is accomplished by means of the additional circuitry of Fig. 3.

Fig. 3 shows in detail the circuitry of the color killer 94, the burst rectifier 91 and the chrominance amplifier 63 which is selectively disabled by the color killer 94 during the reception of black and white broadcast signals or signals whose burst amplitude is so low as to prevent proper action of the receiver in color image reproduction. The color killer circuit comprises simply a triode 116 having an anode 118, control electrode 120 and a cathode 122. The cathode is connected to ground through a self-biasing arrangement, and through a resistor 126 to a terminal 128 to which there is applied a fixed positive potential, as shown. The anode 118 of the color killer triode is connected through resistors 130 and 132 to ground so that, as will be understood, the triode 116 is normally nonconductive. Pulses 57 for the deflection circuits 47 and of approximately 700 volts amplitude (peak-to-peak) are applied to the terminal 134 for application via a capacitor 136 to the anode of the triode, so that, during the pulse interval, the triode is rendered conductive. The degree of conduction of the triode is, however, controlled by a voltage derived by rectification of the color synchronizing bursts in the following manner: The bursts are applied from the separator circuit 71 to the input terminal 138 of the burst rectifier 91. A diode 140, which may take the form of a crystal rectifier diode polarized as shown, serves to rectify the bursts to provide across its output load resistor 142 and filter capacitor 144 a direct current voltage. The voltage produced at the lead 146 by rectification of the bursts will be a negative voltage whose amplitude is proportional to the amplitude of the bursts. That is, the greater the amplitude of the bursts rectified, the more negative will be the voltage at the lead 146 which is, as may be seen from the drawing, connected directly to the control electrode 120 of the color killer tube.

The operation of the color killer circuit 94 is, in general, as follows: during the reception of a color broadcast signal containing the synchronizing bursts, the voltage applied to the control electrode 120 of the tube 116 will be a negative voltage ranging between −50 and −100 volts. Hence, during the application of the pulses 57 to the anode of a color killer tube in coincidence with the burst intervals, the tube 116 will not be rendered conductive. Thus, the positive pulse 57 will appear across the resistors 130 and 132 and will be applied, after filtering in the circuit 150 to the control electrode 154 of the chrominance amplifier tube 156. An inductance coil serves as part of a tuned circuit forming a portion of the bandpass filter stage 62. In this fashion, the chrominance signal as separated in the filter circuit 62 (Fig. 1) and applied to the terminal 160 of the chrominance amplifier will be amplified by the stage 63 for application to the demodulators and matrix circuits 67.

On the other hand, when the signals being received are black and white television signals or signals in which the color synchronizing bursts are of such low amplitude as to prevent color image reproduction, the voltage at the lead 146 from the output of the burst rectifier will become more positive, thereby permitting the color killer tube 116 to conduct during the intervals of the pulses 57, so that a voltage drop will be produced across the resistors 132 and 130, rendering their junction more negative and, specifically, of such value as to bias the control electrode 154 of the chrominance amplifier tube beyond cutoff so that tube no longer conducts to amplify signals from the lead 160.

Further in connection with the chrominance amplifier 63, it will be noted that its cathode 166 is connected to ground through an arrangement comprising the parallel resistors 170 and 172 and the bypass capacitor 174. The resistor 172 is grounded at its lower terminus, while the lower end of the resistor 170 is connected to a terminal 176 at which there exists a potential of −12.5 volts. It will be seen, therefore, that when the color killer is inoperative (i.e. does not disable the amplifier tube 156), the voltage existing at the cathode 166 will be a positive one whose value is determined by the current flowing through the amplifier tube. On the other hand, when the amplifier 156 is cut off by action of the color killer (for black and white reception), the potential at the cathode 166 will be a negative value determined by the division of voltage between the resistors 170 and 172 between ground and −12.5 volts.

As thus far described, the arrangement including the burst rectifier and color killer circuit and the effect of the latter upon the chrominance amplifier do not constitute the present invention per se. It will be noted, however, that the output lead 146 of the burst rectifying circuit 91 is connected via a lead 180 to one end of the serially-connected voltage dividing resistors 182, 184 and 186, the last-named resistor being connected to a terminal 188 at which there exists a positive voltage (e.g. 200 volts) as shown. Adjustably positioned on the resistor 184 is a potentiometer slider tap 190 which is connected, through a filter circuit comprising a capacitor 192 and resistor 196, to the lower terminus of the secondary winding 102' of the coupling transformer 102. Therefore, the bias potential applied to the control electrode 100 of the IF amplifier tube 35' depends upon the voltage existing at the slider tap 190 of the potentiometer. It will further be noted from Fig. 3 that the screen grid electrode 198 of the IF amplifier tube 35' is connected to a source of positive potential at the terminal 108 through a resistor 200 which is not bypassed for signal frequencies and a dropping resistor 202 which is bypassed by a capacitor 204.

The screen grid electrode 198, control electrode 100 and cathode 110 of the pentode 35' may be considered as analogous, respectively, to the anode 16, control electrode 14 and cathode 12 of the triode 10 of Fig. 1 in connection with which the Miller effect has been described. That is to say, there exists inherently a capacity between the screen grid electrode 198 and control electrode 100 of the pentode 35' and, by virtue of the fact that the resistor 200 in series with the screen grid electrode is not bypassed for signal frequencies, the tube 35' will be subject to the Miller effect such that its input capacity will increase generally as the gain of the tube is increased. This input capacity is represented in dotted lines at 206, and is, as shown, in shunt with the winding 102' of the coupling transformer.

It will also be recognized from the foregoing that any variation in the voltage existing at the slider tap 190 will produce a change in the bias of the tube 35' with an attendant change in its input capacity by virtue of the Miller effect. Completing the automatic chroma control circuitry is a diode 210 whose anode is connected to the adjustable tap 190 of the potentiometer and whose cathode is connected via a lead 212 to the cathode 166 of the chrominance amplifier.

The operation of the automatic chroma control circuitry disclosed in Fig. 3 will now be described. With the potentiometer slider tap 190 adjusted such that the response of the amplifier is as shown by Fig. 4*b* (i.e. uniformly flat) during the reception of the color television broadcast in which the desired ratio of chrominance to luminance signal amplitudes is present, the diode 210 will be nonconductive by reason of the fact that the potential of the cathode 166 of the chrominance amplifier will render the cathode of the diode more positive than its anode. This condition will be apparent from the fact that, since the color killer circuit 94 is inoperative to increase the bias on the amplifier tube 156, current through the tube 156 will render the potential of its cathode 166 more positive. If, during such color television reception, the response of the overall transmission link should fall undesirably in the region of the subcarrier frequency, the amplitude of the bursts as applied by the burst separator to the rectifier 91 will decrease correspondingly, so that rectification of the bursts by the diode 140 will produce a less negative (i.e. more positive) potential at the lead 146. Such change in the negative potential at the lead 146 will cause the potential at the slider tap 190 to become more positive, and by means of the filter circuit 192 and 196, the control electrode 100 of the IF amplifier tube becomes more positive, so that the gain of the tube 35' will be correspondingly increased. The increased gain of the tube 35' in conjunction with the Miller effect therein will increase the input capacitance 206 of the tube so as to retune the input circuit in such manner as to change the IF response characteristic to a shape shown by Fig. 4*a*. Specifically, the retuning is in such direction as to shift the resonant frequency of the coupling circuit downwardly, thereby increasing its response at the color subcarrier frequency. The effect of such retuning of the coupling network is that of bringing the amplitude of the chrominance signal component of the composite signal to its proper value relative to that of the luminance component of the signal.

Conversely, if the response of the transmission link should increase undesirably in the region of the color subcarrier frequency, with respect to the main or video carrier frequency, the amplitude of the separated bursts will also be increased, so that the voltage produced at the output lead 146 of the rectifier 91 will become less positive or more negative than the first described potential. Through the action of the voltage-dividing resistors 182, 184 and 186, the voltage at the tap 190 will also become more negative, thereby increasing the negative bias on the amplifier electrode 100 in such manner as to decrease the gain of the tube 35'. Such decreased gain results in a corresponding decrease of the input capacity 206, so that the coupling circuit is retuned upwardly to decrease the amplifier response at the color subcarrier frequency, as shown by the curve of Fig. 4*c*.

In both of the preceding examples, it will be understood that the ordinary automatic gain control action of the circuit 97 serves to maintain the overall gain of the receiver substantially constant in a known manner.

It is also to be noted that both of the preceding examples assume the existence of color synchronizing bursts in the received signal of sufficient amplitude to render the color killer tube 116 nonconductive and ineffective to cut off the chrominance amplifier tube 156. Assuming, on the other hand, that the signal received is a black and white television signal or a color signal whose bursts are of insufficient amplitude to maintain the color killer tube in its cutoff condition, the following action will occur in the circuitry of Fig. 3: In the absence of bursts, the potential at the lead 146 will become greatly more positive than its value in the presence of rectified bursts, so that the tube 116 will conduct during the application of the positive pulses 57 to its anode. Conduction of the tube 116 will produce a voltage drop across its load resistor 132, thereby applying a negative bias to the control electrode 154 of the chrominance amplifier tube 156, which bias is sufficient to cut off anode-cathode conduction in the tube. Upon the cessation of current in the tube 156, the potential of the cathode 166 will be determined by division of voltage by the resistors 170 and 172, as explained to produce a negative voltage which, when applied via the lead 212 to the cathode of the diode 210 will render the diode conductive. The potential existing at the slider tap 190 in that event is determined by the division of voltage between the potential differences of the terminals 188 and the lead 212 which produces a resultant voltage at the tap 190 of the value required for biasing the amplifier 35' normally so that its response characteristic is flat as shown by the curve of Fig. 4*b*. Stated otherwise, the automatic chroma control voltage is "clamped" to the reference potential determined by the fixed voltages at terminal 188 and that existing at the cathode 166 of the chrominance amplifier when no current is flowing in that tube.

It will, therefore, be appreciated from the foregoing that the automatic chroma control action is caused to "snap back" to cause the tuning of the IF amplifier to revert to one in which the response is flat. Such snap-back action, moreover, occurs in time coincidentally with the action of the color killer circuit 94 to maintain a flat response characteristic for black and white signal operation.

It will be recognized from the fact that the present invention exercises automatic chroma control action by controlling the frequency response characteristic of the IF amplifier that such undesirable events such as "locking out" of the automatic chroma control and color killer circuit are obviated. Moreover, by virtue of the snap back action of the A.C.C. arrangement of the invention, the tuning of the IF amplifier is returned to its proper condition for flat response during reception of a black and white signal, so that there is no possibility of its "hunting" for a detuning action in a vain attempt to increase response of the receiver for sub-carrier frequencies when no color signals are present.

Having thus described our invention, what we claim as new and desire to secure by Letters Patent is:

1. In a color television receiver having a source of composite signals including luminance signals, chrominance signals and color synchronizing bursts, said composite signals lying within a predetermined frequency band; an amplifying channel operatively coupled to said source for receiving and amplifying such signals and including a frequency response determining circuit for controlling the amplitude versus frequency response of said channel over said frequency band: a chrominance channel coupled to said amplifying channel for processing such chrominance signals; automatic chroma control means responsive to said color synchronizing bursts and coupled to said frequency responsive-determining circuit for controlling the relative amplitude versus frequency response of said amplifying channel over said frequency band in accordance with the amplitude of such bursts; and means coupled to said last-named means and responsive to the amplitude of such bursts for wresting control of said frequency response-determining circuit from said automatic chroma control means in response to a decrease in burst amplitude below a predetermined level.

2. In a color television receiver having a source of composite signals including luminance signals, chrominance signals and color synchronizing bursts, said composite signals lying within a predetermined frequency band: an amplifying channel operatively coupled to said source for receiving and amplifying such signals and including a frequency response determining element for controlling the relative amplitude versus frequency response of said channel over said frequency band; a chrominance channel coupled to said amplifying channel for processing such chrominance signals; means responsive to the amplitude of such bursts for rendering said chrominance channel operable in the presence of such bursts of at least a predetermined amplitude; automatic chroma control means coupled to said last-named means and to said frequency response determining element for controlling the relative amplitude versus frequency response of said amplifying channel over said frequency band in accordance with the amplitude of such bursts; and means coupled to and responsive to said burst amplitude-responsive means and operatively connected to said frequency response-determining element for wresting control of said frequency response determining element from said automatic chroma control means in response to a decrease in burst amplitude below a predetermined level.

3. In a color television receiver having a source of a composite signal which includes luminance and chrominance components and color synchronizing bursts, said luminance and chrominance components lying within a predetermined frequency band: an amplifying channel including an amplifier operatively coupled to said source for receiving and amplifying signals therefrom; a chrominance channel coupled to said amplifying channel for processing such chrominance components of such composite signal; a first means coupled to said chrominance channel and responsive to such color synchronizing bursts for inactivating said chrominance channel in the absence of such bursts; a second means coupled to said amplifying channel and responsive to the amplitude of such bursts for controlling the relative amplitude versus frequency response of such amplifier over said frequency band in accordance with the amplitude of such bursts when such bursts are present; and means connected to said chrominance channel-inactivating means and to said amplifier frequency response-controlling means for controlling said amplifier frequency response-controlling means when said chrominance channel-inactivating means is operative to inactivate said chrominance channel during the absence of such bursts.

4. In a color television receiver having a source of composite color television signals including luminance signals, chrominance signals and color synchronizing bursts, said composite signals lying within a predetermined frequency band: an amplifying channel operatively coupled to said source for receiving and amplifying such composite color television signals and including a frequency response determining circuit for controlling the relative amplitude versus frequency response of said channel over said frequency band; a chrominance channel coupled to said amplifying channel for receiving and processing such chrominance signals; means for detecting the amplitude of such bursts from said source and for producing a direct current control signal indicative of the amplitude of such bursts; automatic chroma control means coupled to said last-named means and to said frequency response determining circuit for controlling the relative amplitude versus frequency response of said amplifying channel over said frequency band to maintain a substantially constant relation between the amplitude of such luminance and chrominance signals at the output of said amplifying channel, respectively, in response to such direct current signal indicative of the detected amplitude of such bursts; and means coupled to said last-named means and responsive to said direct current signal for disabling said automatic chroma control means when the amplitude of such bursts decreases below a predetermined level.

5. In a color television receiver having a source of composite signals including luminance components, chrominance components and color synchronizing bursts, said luminance and chrominance components lying within a predetermined frequency band: an amplifying channel operatively coupled to said source for receiving and amplifying such signals and having a tuned circuit determinative of its frequency response; a chrominance channel coupled to said amplifying channel for receiving and processing such chrominance signal components; means in said receiver for detecting the amplitude of such bursts and providing a direct current signal indicative of burst amplitude; means operatively associated with said burst-detecting means and said tuned circuit for controlling the resonant frequency of said circuit, whereby to determine the relative amplitude versus frequency response of said amplifying channel over said frequency band; a source of reference voltage; and switch means associated with said frequency controlling means and coupled to said source of reference voltage for substituting such reference voltage for such direct current signal to control said tuned circuit resonant frequency in the absence of color synchronizing bursts from such composite signal.

6. In a color television receiver having a source of composite signals including luminance components, chrominance components and color synchronizing bursts, said luminance and chrominance components lying within a predetermined frequency band: an amplifying channel operatively coupled to said source for receiving signals therefrom, said channel including an electron tube amplifier having a tuned circuit associated therewith and determinative of the relative amplitude versus frequency response of said channel over said frequency band, said electron tube amplifier being subject to Miller effect action such that its inherent input capacity is variable as a function of its gain, such input capacity being effectively in shunt with said tuned circuit; a source of reference bias operatively connected to said amplifier tube; means associated with said receiver for detecting the amplitude of such synchronizing bursts and providing a direct current voltage variable as a function of burst amplitude; and switch means coupled to said burst detecting means and to said source of reference bias and connected to said amplifier tube, said switch means being normally operative to apply such direct current voltage to said electron tube amplifier for controlling its gain as a function of burst amplitude and operative, when the amplitude of such bursts decreases below a certain level, to apply such reference bias to said amplifier.

7. In a color television receiver adapted to receive and to operate either upon color television signals including luminance components, chrominance components and color synchronizing bursts, said luminance and chrominance components lying within a predetermined frequency band or upon black-and-white television signals which lack such bursts: an amplifying channel associated with said receiver for receiving and amplifying signals applied to said receiver, said channel including an electron tube amplifier having an inherent input capacity variable as a function of its gain and at least a cathode, a control electrode and a further electrode bearing an anodic relation to said control electrode; a resonant circuit operatively associated with said amplifier tube and determinative, together with such inherent capacity, of the relative amplitude versus frequency response of said amplifying channel over said frequency band; means connected to said channel for detecting the amplitude of such bursts when present in the received signal and for producing a first bias voltage which is variable as a function of burst amplitude; a source of a second, fixed bias voltage coupled to said electron tube amplifier control electrode for controlling the gain of said amplifier such that its inherent input capacity tunes said resonant circuit so that said amplifying channel has a flat frequency response; and switch means coupled to said burst amplitude detection means and to said control electrode and responsive to the presence or absence of such bursts for selectively applying said first bias to said control electrode when such bursts are present in such received signals and for applying such second bias to said control electrode when the signals received by said receiver lack such bursts.

8. In a color television receiver adapted to receive and operate either upon color television signals including luminance components, chrominance components and color synchronizing bursts, said luminance and chrominance components lying within a predetermined frequency band or upon black-and-white signals which lack such bursts: an amplifying channel associated with said receiver for receiving and amplifying signals applied to said receiver, said channel including an electron tube amplifier having at least a cathode, a control electrode and a further electrode bearing an anodic relation to said control electrode and having further an inherent circuit input capacity variable as a function of its gain; a resonant circuit operatively associated with said amplifier tube and determinative, together with such input capacity, of the relative amplitude versus frequency response of said amplifying channel over said frequency band; a chrominance channel coupled to said amplifying channel in signal-receiving relation therewith for processing such chrominance components; means coupled to said chrominance channel for detecting the amplitude of such bursts when present in the received signal and for producing a first bias voltage which is variable as a function of burst amplitude; a source of a second, fixed bias voltage coupled to said electron tube amplifier control electrode for controlling the gain of said tube such that its inherent input capacity tunes said resonant circuit so that said amplifying channel has a substantially flat frequency response over said frequency band; means coupled to said chrominance channel and to said burst amplitude-detecting means for disabling said chrominance channel in the absence of bursts of a predetermined minimum amplitude from such received signals; and switch means coupled between said amplifier control electrode and said source of second bias voltage and responsive to the disabling of said chrominance channel by said last-named means for selectively applying said fixed bias voltage to said control electrode when said chrominance channel is rendered inoperative during the reception of signals from which said bursts are absent.

9. The invention as defined by claim 8 wherein said amplifying channel comprises an intermediate frequency amplifying channel and wherein said electron tube amplifier comprises a pentode whose screen grid electrode comprises said further electrode.

10. Color television apparatus which comprises: a source of composite television signals including luminance components, chrominance components and color synchronizing bursts, said luminance and chrominance components lying within a predetermined frequency band; an amplifying channel coupled to said source to receive signals therefrom, said channel including a frequency response determining circuit for controlling the relative amplitude versus frequency response of said channel over said frequency band; automatic chroma control means operatively coupled to said channel frequency determining circuit for controlling the relative amplitude versus frequency response of said channel as between said luminance and chrominance components in accordance with the amplitude of such bursts; and means coupled to said last-named means and responsive to the amplitude of such bursts for controlling said frequency response determining circuit in response to a decrease in burst amplitude below a selected level.

References Cited in the file of this patent

UNITED STATES PATENTS

| | | |
|---|---|---|
| 2,514,443 | Crosby | July 11, 1950 |
| 2,573,248 | Cotsworth | Oct. 30, 1951 |
| 2,757,229 | Larky | July 31, 1956 |
| 2,798,900 | Bradley | July 9, 1957 |

FOREIGN PATENTS

| | | |
|---|---|---|
| 702,627 | Great Britain | Jan. 20, 1954 |

OTHER REFERENCES

Admiral: "Introduction to Color Television," page 36, February 1954.